United States Patent

Yoon et al.

[11] Patent Number: 6,155,698
[45] Date of Patent: Dec. 5, 2000

[54] PROJECTION DISPLAY APPARATUS HAVING A FRESNEL SCRAMBLER

[75] Inventors: Hung-Soo Yoon, Seoul; Myung-Ryul Jung, Suwon, both of Rep. of Korea

[73] Assignee: Samsung Electronics Co. Ltd., Kyungki-Do, Rep. of Korea

[21] Appl. No.: 09/083,243

[22] Filed: May 22, 1998

[30] Foreign Application Priority Data

May 26, 1997 [KR] Rep. of Korea ............... 97-20655

[51] Int. Cl.⁷ .................................................. F21V 29/00
[52] U.S. Cl. ..................... 362/268; 359/599; 359/742; 345/64
[58] Field of Search ........................... 362/268; 359/599, 359/707, 742; 349/5, 64

[56] References Cited

U.S. PATENT DOCUMENTS

| | | | |
|---|---|---|---|
| 4,737,896 | 4/1988 | Mochizuki et al. | 349/64 |
| 5,146,365 | 9/1992 | Minoura et al. | 359/742 |
| 5,161,880 | 11/1992 | Azuma | 362/307 |
| 5,537,171 | 7/1996 | Ogino et al. | 349/5 |

*Primary Examiner*—Darren Schuberg
*Attorney, Agent, or Firm*—Sughrue, Mion, Zinn, Macpeak & Seas, PLLC

[57] ABSTRACT

A projection display apparatus includes a scrambler for making a distribution of light intensity uniform and a Fresnel lens positioned between the scrambler and a lamp, for converting the light incident from the lamp into light parallel to the optical axis of the scrambler. The angle of divergence of the light emerging from the scrambler is reduced by means of the Fresnel lens. Accordingly, the angle of divergence of the light incident to the LCD panel also becomes small. Thus, the light incident to the surface of each pixel in the LCD panel increases, with a result that contrast increases and resolution heightens to improve picture quality. Also, as the angle of divergence of the light at the incident side of the LCD panel decreases, the aperture of the projection lens positioned in front of the LCD panel also decreases which enables the whole optical system to be compact and lowers production cost.

4 Claims, 4 Drawing Sheets

PROJECTION DISPLAY APPARATUS HAVING A FRESNEL SCRAMBLER

BACKGROUND OF THE INVENTION

1. Field of the Invention

The present invention relates to a projection display apparatus including a scrambler for making a distribution of light intensity uniform.

2. Description of the Related Art

FIG. 1 shows a conventional projection display. The projection display includes an elliptical lamp 11 for converging light an a scrambler 13 for making a distribution of the amount of light emitted from the elliptical lamp 11 uniform. A relay lens 15 illuminates the light toward a liquid crystal display (LCD) panel 19. A collimator lens 17 which is positioned between the relay lens 15 and the LCD panel 19, collimates the light incident from the relay lens 15 in parallel form. The collimated light contains a video signal displayed by means of the LCD panel 19. In FIG. 1, character "A" denotes a focal length of the lamp 11, character "B" denotes the length of the scrambler 13 and character "C" denotes a focal length of the relay lens 15.

The conventional projection display shown in FIG. 1 uses only the scrambler 13 in order to make uniform the distribution of intensity of the light emitted from the elliptical lamp 11. However, when the light entering the scrambler 13 has a large angle of incidence $\theta_0$ with respect to the scrambler 13, the light emerging from the scrambler 13 has a large angle of emergence $\theta_2$ with respect to the scrambler 13. Consequently, the light emerging from the scrambler 13 has a large angle of divergence.

As a consequence of the large angle of divergence, the size of optical elements, such as a dichroic mirror and a relay lens, used for illuminating the light diverging from the scrambler 13 at a large angle towards a display panel, such as LCD panel 19, without loss of light is increased. As a result optical design becomes difficult. Also, as the angle of emergence $\theta_2$ of the light emerging from the scrambler 13 is enlarged, the angle of incidence of the light incident to the surface of the LCD panel 19 is also enlarged, even through the light passes through the collimator lens 17. As a result, the angle of divergence of the light having passed through each pixel on the surface of the LCD panel 19 is enlarged, which lowers the contrast of a picture on the LCD panel 19.

To solve the above defect of the conventional art, the angle of incidence $\theta_0$ of the light emitted from the lamp 11, with respect to the incident surface of the scrambler 13, should be reduced. This would thereby reduce the angle of emergence $\theta_2$ of the light emerging from the scrambler 13.

SUMMARY OF THE INVENTION

To solve the above problems, it is an object of the present invention to provide a projection display apparatus using a Fresnel scrambler in which the angle of incidence of the light incident to a display panel is small, and the angel of emergence from the scrambler is reduced. This increases the amount of parallel light incident to each pixel of the display panel to thus heighten the resolution of the display panel.

To accomplish the above object of the present invention, there is provided a projection display apparatus comprising a Fresnel lens arranged at the incident side of a scrambler, for converting the light emitted from a lamp into light, parallel to the optical axis of the scrambler.

BRIEF DESCRIPTION OF THE DRAWINGS

The preferred embodiments are described with reference to the drawings wherein.

DETAILED DESCRIPTION OF THE PREFERRED EMBODIMENTS

Preferred embodiments of the present invention will be described with reference to the accompanying drawings.

Figure 1:
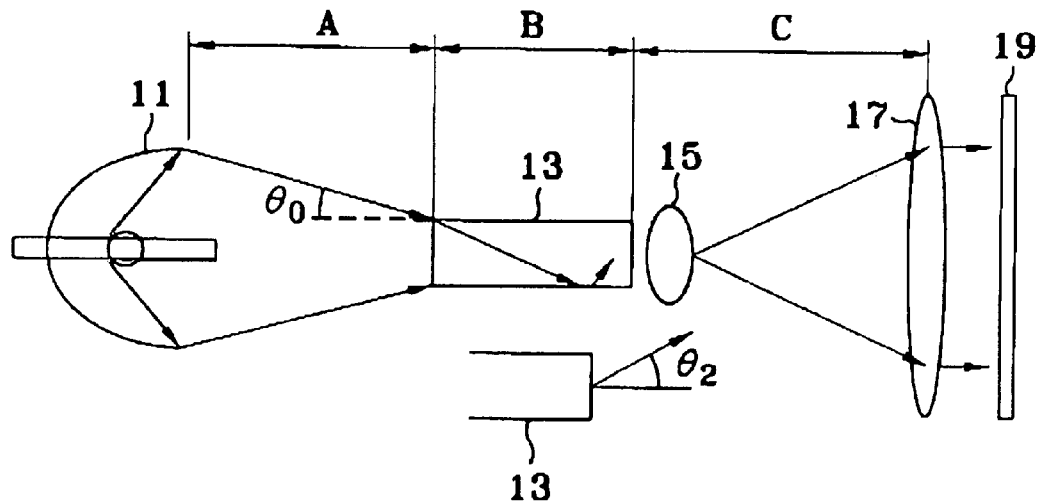
FIG. 1 shows a conventional projection display apparatus.
Figure 2:
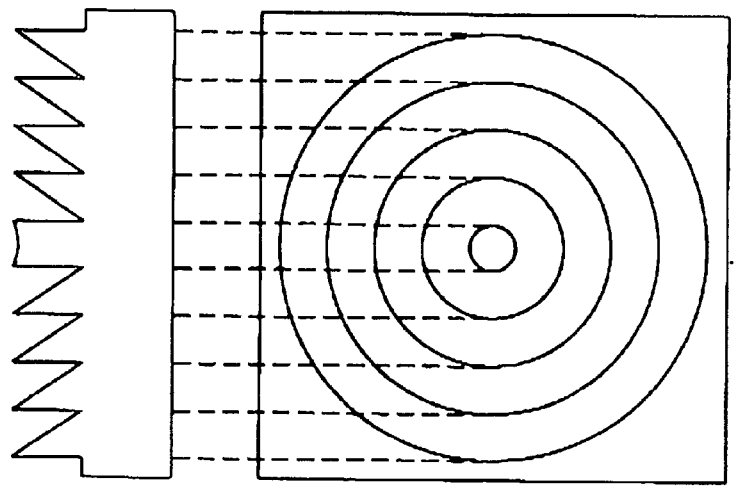
FIG. 2 shows side and front views of an example scrambler.
Figure 3:
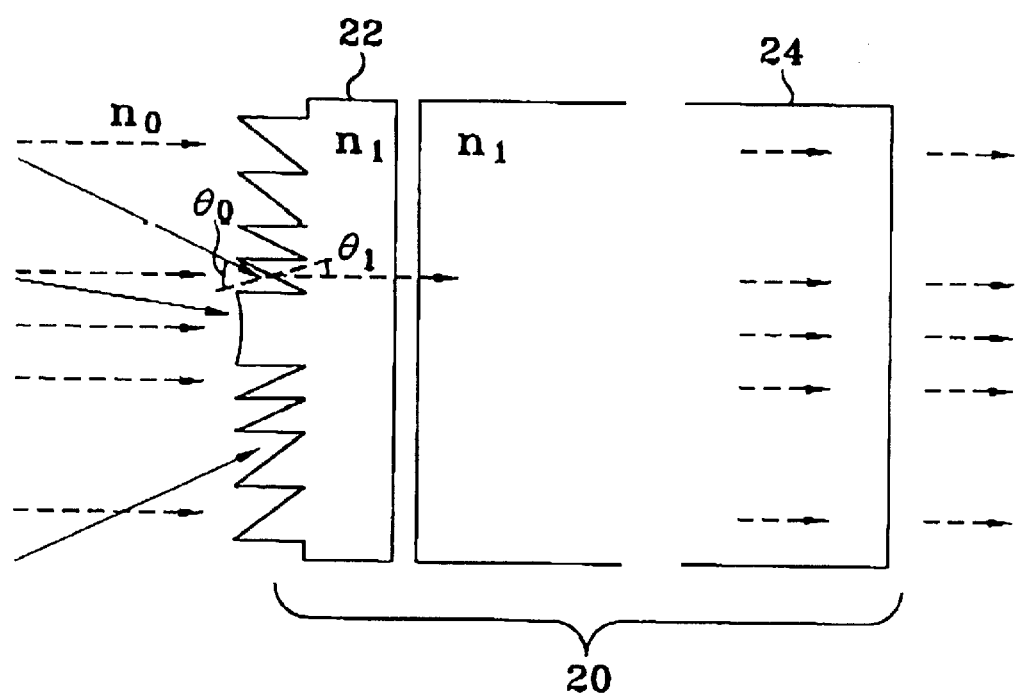
FIG. 3 shows a Fresnel scrambler according to a preferred embodiment of the present invention.

A Fresnel scrambler 20 shown in FIG. 3 includes a Fresnel lens 22 and a scrambler 24. In the Fresnel scrambler 20 of this embodiment, the Fresnel lens 22 is formed by etching the surface of the scrambler 24 on the incident side. Alternatively, a separate Fresnel lens 22 can be attached to the incident side of the scrambler 24. This is shown, for example, in FIG. 2.

Assuming the refractive index of air is $n_0$ and the refractive index of the Fresnel scrambler 20 is $n_1$, the Snell's law establishes following equation (1).

$$n_0 \sin\theta_0 = n_1 \sin\theta_1 \qquad (1)$$

Here, $n_0$ is the refractive index op air, which is approximately equal to one, and $n_1$ is the refractive index of the material of the Fresnel scrambler 20, for example, glass, in which $n_0 \leq n_1$, $\theta_0$ is an angle of incidence on the lamp-side or incident surface of the Fresnel lens 22, and $\theta_1$ is an angle of refraction in the lamp-side surface of the Fresnel lens 22.

Therefore, since the light incident to the lamp-side surface of the Fresnel scrambler 20 is refracted at the lamp-side surface of the Fresnel lens 22, the Fresnel scrambler 20 outputs light parallel to the optical axis of the Fresnel scrambler. Thus, if the angle of incidence of the light incident to the surface of the Fresnel scrambler 20 is reduced, the angle of emergence of the light at the surface of the Fresnel scrambler 20 is also reduced in proportion to the angle of incidence.

Figure 4A:
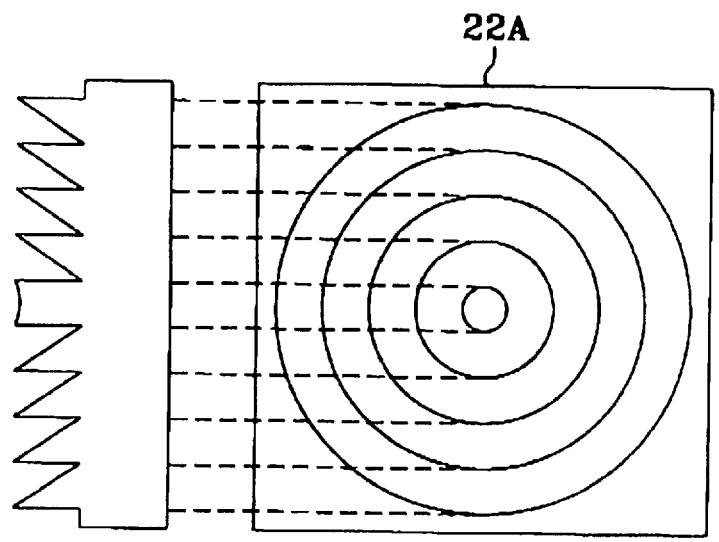
FIG. 4A shows side and front views of a Fresnel lens having a negative optical power and FIG. 4B shows a projection display apparatus which includes the Fresnel scrambler having the Fresnel lens shown in FIG. 4A.
Figure 4B:
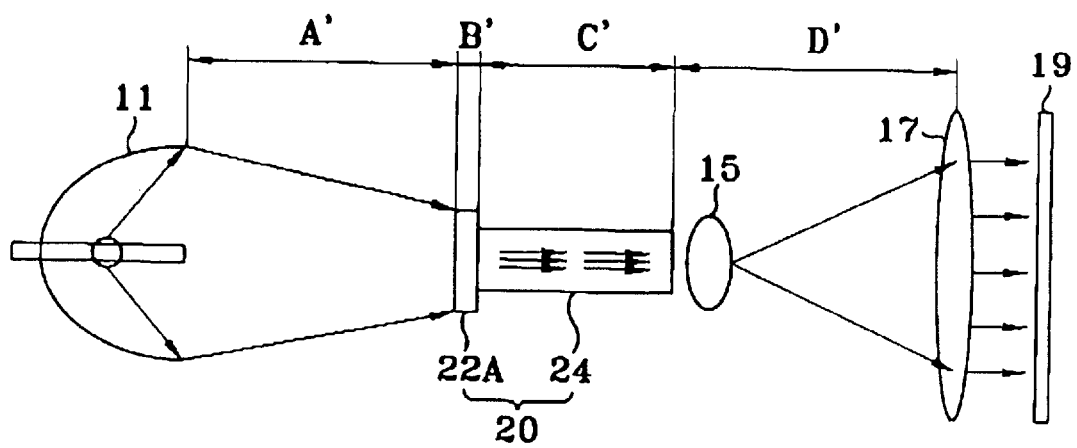
Figure 5A:
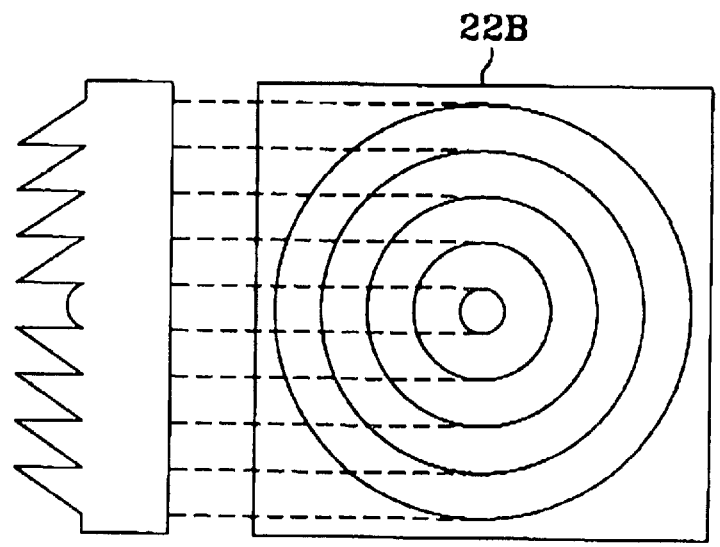
FIG. 5A shows side and front views of a Fresnel lens having a positive optical power and FIG. 5B shows a projection display apparatus which includes the Fresnel scrambler having the Fresnel lens sown in FIG. 5A.
Figure 5B:
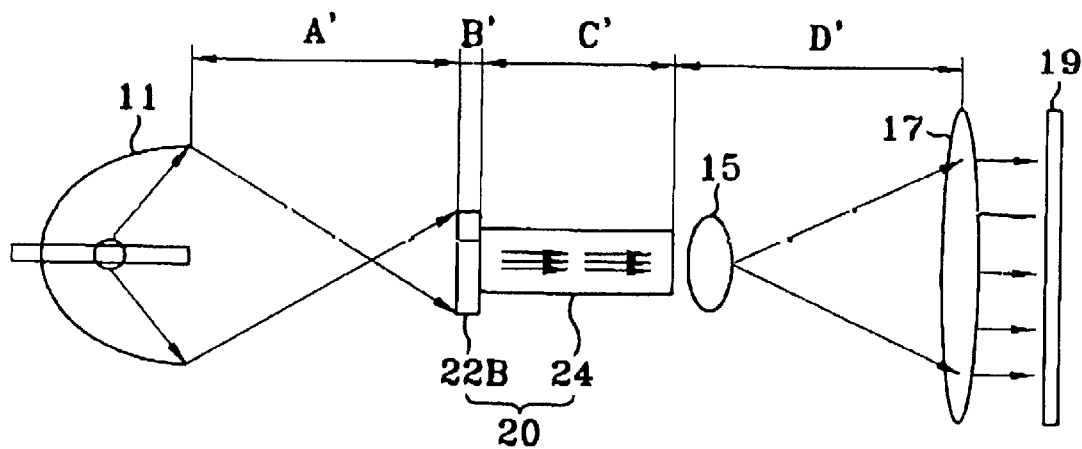

FIG. 4A shows the side and front of the Fresnel lens 22A having negative optical power, and FIG. 4B shows a projection display apparatus having the Fresnel lens 22A shown in FIG. 4A. FIG. 5A shows the side and front of the Fresnel lines 22A having positive optical power, and FIG. 5B shows a projection display apparatus having the Fresnel lens 22B shown in FIG. 5A. In the projection display apparatuses shown in FIGS. 4B and 5B, reference numeral 20 denotes the Fresnel scrambler of FIG. 3 which includes the Fresnel lens 22A and 22B shown in FIGS. 4A and 5A, respectively. In FIGS. 4B and 5B, character A' denotes the focal length of a lamp 11, B' denotes the length of a Fresnel lens 22A or 22B, C' denotes the length of a scrambler 24 and D' denotes the focal length of a relay lens 15. The Fresnel lens 22A or 22B is positioned in the light path between the lamp 11 and the scrambler 24. The Fresnel lens 22A or 22B converts the light having a large angle of incidence at the incident side into light parallel to the optical axis of the scrambler 24 or relay lens 15 at the emergence side to thereby reduce the angle of emergence. In more detail, the Fresnel lens 22A having negative optical power shown in FIG. 4A refracts the light incident from the lamp 11 in divergent form to convert it into parallel light. The Fresnel lens 22B having positive power shown in FIG. 5A refracts the light incident from the lamp 11 in convergent form to convert it into parallel light.

As described above, the projection display apparatus having a Fresnel scrambler can reduce the angle of emergence of the light emerging from the display side surface of the scrambler. Accordingly, the angle of divergence of the light incident to the display panel, e.g. the LCD panel, also becomes small. Thus, the amount of the light incident to the surface of each pixel in the LCD panel increases, with the result that contrast increases, and resolution heightens to improve picture quality. Also, as the angle of divergence of the light at the incident side of the LCD panel decreases, the aperture of the projection lens positioned in front of the LCD panel also decreases, which enables the whole optical system to be compact and lowers production costs.

While only certain embodiments of the invention have been specifically described herein, it will be apparent that numerous modifications may be made thereto without departing from the spirit and scope of the invention.

What is claimed is:

1. A projection display apparatus comprising:
   a lamp;
   a liquid crystal display (LCD) panel;
   a scrambler disposed between the lamp and the liquid crystal display panel for making uniform a distribution of intensity of light at the LCD panel, the light being emitted from the lamp; and
   a Fresnel lens disposed between the lamp and the scrambler, for converting the light emitted from the lamp into light parallel to an optical axis of the scrambler, wherein the Fresnel lens has a negative optical power, the Fresnel lens refracting the light emitted from the lamp in a convergent form, thereby creating the light parallel to the optical axis of the scrambler.

2. The projection display apparatus according to claim 1, wherein the Fresnel lens is integrally incorporated with the scrambler.

3. The projection display apparatus according to claim 2, wherein the Fresnel lens is formed by etching an optical surface of the scrambler.

4. A projection display apparatus comprising:
   a lamp;
   a liquid crystal display (LCD) panel;
   a scrambler disposed between the lamp and the liquid crystal display panel for making uniform a distribution of intensity of light at the LCD panel, the light being emitted from the lamp; and
   a Fresnel lens disposed between the lamp and the scrambler, for converting the light emitted from the lamp into light parallel to an optical axis of the scrambler, wherein the Fresnel lens has a negative optical power, the Fresnel lens refracting the light emitted from the lamp in a convergent form, thereby creating the light parallel to the optical axis of the scrambler, wherein said light at said LCD panel emerging from said scrambler is substantially parallel to said optical axis of said scrambler.

* * * * *